United States Patent [19]

Sugiyama

[11] Patent Number: 5,191,414
[45] Date of Patent: * Mar. 2, 1993

[54] INTERFIELD PREDICTIVE ENCODER AND DECODER FOR REPRODUCING A SIGNAL SUBJECTED TO PREDICTIVE ENCODING BY ENCODER INTO AN IMAGE SIGNAL

[75] Inventor: Kenji Sugiyama, Noda, Japan

[73] Assignee: Victor Company of Japan, Ltd., Yokohama, Japan

[*] Notice: The portion of the term of this patent subsequent to Jan. 1, 2008 has been disclaimed.

[21] Appl. No.: 675,182

[22] Filed: Mar. 26, 1991

[30] Foreign Application Priority Data

Mar. 27, 1990 [JP] Japan .................................. 2-77625

[51] Int. Cl.$^5$ .............................................. H04N 7/13
[52] U.S. Cl. ......................................... 358/136; 358/135
[58] Field of Search ................ 358/133, 135, 136, 105

[56] References Cited

U.S. PATENT DOCUMENTS

| | | | |
|---|---|---|---|
| 4,217,609 | 8/1980 | Hatori et al. | 358/136 |
| 4,498,102 | 2/1985 | Richard et al. | 358/136 |
| 4,546,386 | 10/1985 | Matsumoto et al. | 358/136 |
| 4,982,285 | 1/1991 | Sugiyama | 358/136 |
| 4,985,768 | 1/1991 | Sugiyama | 358/136 |

FOREIGN PATENT DOCUMENTS 2-192378  7/1990  Japan .
2-219466  9/1990  Japan .
2-285816  11/1990  Japan .

Primary Examiner—Victor R. Kostak
Assistant Examiner—Michael H. Lee
Attorney, Agent, or Firm—Michael N. Meller

[57] ABSTRACT

An interfield predictive encoder comprises: a first encoding element for setting, from successive fields of an image signal inputted in succession, independent fields located at a fixed interval and such that odd and even fields exist one after another to independently encode these independent fields within respective fields; a predictive signal formation element for forming predictive signals of non-independent fields between the independent fields on the basis of signals of respective independent fields before and after those non-independent fields; and a second encoder element for predicting signals of the non-independent fields on the basis of predictive signals corresponding thereto to conduct encoding with respect to predictive errors. Further, the second encoding element may be constructed to adaptively mix predictive signals by signals of the both independent fields before and after the respective non-dependent fields formed by the predictive signal formation means at a mixing ratio for providing a predictive signal of the highest predictive efficiency in dependency upon changes of signals every block in the respective non-independent fields to predict signals every block of the non-independent fields on the basis of the mixed predictive signals to conduct encoding with respect to respective predictive errors. In addition, a decoder is adapted to carry out decoding processing corresponding to the encoding processing on the basis of data encoded by the interfield predictive encoder to thereby decode an image signal of successive fields.

4 Claims, 3 Drawing Sheets

INTERFIELD PREDICTIVE ENCODER AND DECODER FOR REPRODUCING A SIGNAL SUBJECTED TO PREDICTIVE ENCODING BY ENCODER INTO AN IMAGE SIGNAL

BACKGROUND OF THE INVENTION

This invention relates to an efficient encoder for efficiently encoding a moving image signal with a less quantity of codes and an efficient decoder therefor in various equipments such as recording/transmission equipments, or other display devices, etc., used for signal processing of digital signals, and more particularly to an interfield predictive encoder for a moving picture signal subjected to interlace scanning and a decoder therefor.

As the coding system of utilizing correlation between frames of a moving signal of efficient coding systems of encoding a moving picture signal with a less quantity of codes, there is known an interframe predictive coding.

This interframe predictive coding system performs a predictive coding by drawing attention to the fact that ordinary moving pictures are fairly similar to each other between frames. Namely, a procedure is employed to predict a signal of a frame subject to coding from a signal of a last coded frame to encode only a predictive error (residual).

In the case of the interframe predictive coding, however, if an image varies to much degree by movement of an object or scene change, suitable prediction may fail to be conducted. Accordingly, there are instances where it is desirable to carry out encoding within a frame (field) without conducting interframe prediction.

In view of this, there have been conducted studies on the adaptive predictive coding to carry out interframe prediction in the case where interframe prediction is considered to be suitable, and to carry out interframe (intrafield) prediction in the case where otherwise. In recent years, a motion compensated interframe predictive coding to carry out prediction by altering predictive methods in correspondence with the motion of an image becomes popular.

As an example, there is announced in "15/30 Mb/s motion compensated interframe/interfield/interframe adaptive predictive coding system" Journal of the Institute of Television Engineers, Vol. 39, No. 10, pp. 861 (11) to 868 (18) (October, 1985), etc.

This system encodes a television relay signal at a relatively high rate. For a moving picture signal subjected to interlace scanning, the interfield (intraframe) prediction is used in addition to the motion compensated interframe prediction and the intrafield prediction.

In the case of attempting to decode a certain frame, such a system being studied in the communication system requires all past data because data is a stack of past data. Accordingly, in the case where there is a necessity of carrying out decoding from an arbitrary place by random access or high speed search, etc. in the storage system media, the interframe prediction must be reset on the basis of a fine unit (4 to 8 frames).

However, if the interframe prediction is reset on the basis of a fine unit, an original image signal is subjected to intraframe coding as it is, leading to lowered coding efficiency. On the other hand, in the case of a reverse playback for carrying out playback in an order, in terms of time, opposite to that in the case of an ordinary playback, predictive values for decoding cannot be provided by the conventional prediction by the last or preceding frame, disadvantageously resulting in failure to decoding.

In view of this, as the means for solving the problems with such a conventional recursive interframe predictive coding, the inventor of the present invention has already inverted a method positively utilizing, for the purpose of random access or high speed search, the fact that independent frames cyclically exist to make a prediction for frames therebetween by using preceding and succeeding (old and new) independent frames on the basis of the linear prediction, etc., thus to improve the coding efficiency. The patent application therefor was filed by this applicant (Japanese Patent Application No. 11587/89 -Japanese Patent Application Laid Open No. 192378/90-), entitled "Interframe predictive encoding system", which corresponds to U.S. patent application Ser. No. 07/465,747 patented on Jan. 15, 1991 "Interframe predictive encoding system with encoded and transmitted prediction error").

"Interframe predictive encoding system" according to the earlier patent application by this applicant (hereinafter referred to as "earlier application") sets in advance independent frames at a fixed interval to make a prediction for frames therebetween by preceding and succeeding (old and new) independent frames, thus to encode them. Accordingly, random access can be provided using the interval between independent frames as a unit in the storage system media. Thus, high speed search can be conducted without wastefulness and prediction in conformity with changes in an image can be conducted. In addition, since S/N ratio of the predictive signal is also improved, a higher precision predictive signal can be provided. Further, since coded data thus obtained are of symmetric structure on the time base, reverse playback can be advantageously realized with ease. In addition, since this predictive encoding system is not cyclic prediction as in the prior art, the decoding processing on the encoder side can be eliminated.

Meanwhile, the above-described conventional predictive encoding system has the following problem in encoding an interlaced signal in addition to the above-described problems.

Namely, the drawbacks with respective predictions in "15/30 Mb/s motion compensated interframe/interfield/intraframe adaptive predictive encoding system" disclosed as the prior art are as follows. First, the interfield prediction is only effective in the case where motion of an image is to an extent corresponding to $\frac{1}{2}$ line, but is not so advantageous in the case of a still picture or in the case where there is any motion more than $\frac{1}{2}$ line. Furthermore, the motion compensated interframe prediction is carried out every field, and each field includes aliasing due to line thinning of interlaced signals. As a result, the interfield prediction cannot necessarily make a prediction.

On the other hand, when coding of the earlier application (Japanese Patent Application Laid Open No. 192378/90) by this applicant is applied to interlaced signals as it is, the following problems would arise.

FIG. 1 is a view showing the field configuration in the case where the interval (N) between independent frames in the earlier application is 5 frames.

In this figure, black circles and white circles represent lines of fields independently encoded and lines of fields subjected to interfield prediction and encoding, respectively. Further "o" and "e" represent odd fields and even fields, respectively.

In independently conducting encoding within a frame, since there is any time change between fields, if a pattern of an image is moving, a double image results. Thus, coding efficiency is lowered to much extent.

Further, in the case of reproducing or playing back only independent frames to make a high speed search, respective fields are reproduced in order of a, b, c and d in FIG. 1. Accordingly, motion of an image between respective fields and motion of an image between independent frames are equidistantly reproduced. As a result, motion of the image become unnatural. If an approach is employed to reproduce fields on only one side (i.e., only odd fields, or only even fields), motion of the image becomes natural, but the vertical resolution is reduced to one half.

SUMMARY OF THE INVENTION

With the above in view, an object of this invention is to provide an interfield predictive encoder and a decoder for a signal subjected to predictive encoding, which have solved the problems with the above-mentioned prior arts, which is easy to cope with fast movement or changes of an image by a moving image signal subjected to interlace scanning to improve the predictive efficiency to more degree, and which permits the predictive error (residual) to be reduced by improving the predictive efficiency, resulting in less quantity of data subjected to encoding.

To achieve the above-mentioned object, as a first aspect, there is provided an interfield predictive encoder comprising first encoder means for setting, from successive fields of image signals inputted in succession, independent fields located at a fixed interval and such that odd and even fields exist one after another to independently encode these independent fields within respective fields; predictive signal formation means for forming predictive signals of non-independent fields between the independent fields on the basis of signals of respective independent fields before and after those non-independent fields; and second encoder means for predicting signals of the non-independent fields on the basis of predictive signals corresponding thereto to conduct encoding with respect to predictive errors.

Further, as a second aspect, there is provided an interfield predictive encoder comprising for setting, from successive fields of image signals inputted in succession, independent fields located at a fixed interval and such that odd and even fields exist one after another to independently these independent fields within the respective fields; predictive signal formation means for forming predictive signals of non-independent fields between the independent fields on the basis of signals of independent fields before and after respective non-independent fields, and second encoder means for adaptively mixing predictive signals by signals of the both fields before and after the respective non-dependent fields formed by the predictive signal formation means at a mixing ratio for providing a predictive signal of the highest predictive efficiency in dependency upon changes of signals every block in the respective non-independent fields to predict signals every block of the non-independent fields on the basis of the mixed predictive signals to conduct encoding with respective predictive errors.

In addition, as a third aspect, there is provided a decoder for carrying out decoding processing corresponding to the above-mentioned encoding processing on the basis of data encoded by the above-mentioned interfield predictive encoder of either the first or second aspect to thereby decode an image signal of successive fields.

In the interfield predictive encoder and decoder therefor of the structure described above, an approach is employed to set in advance, at a fixed interval (several fields), independent fields independently encoded within fields without using the interfield prediction from successive fields of image signals inputted in succession. Further, the independent fields are such that odd and even fields exist one after another. In this case, the interval N between independent fields becomes equal to odd number (3, 5, 7, . . .).

With respect to non-independent fields between independent fields, an approach is employed (1) to make a prediction on the basis of predictive signals by the both independent fields preceding and succeeding (old and new) the respective non-dependent fields to make encoding with respect to predictive errors, or (2) to adaptively mix predictive signals (linear predictive values) by the both independent fields preceding and succeeding (old and new) non-independent fields at a mixing ratio for providing a predictive signal of the highest predictive efficiency in dependency upon changes in signals every block in the respective non-independent fields to predict signals every block to conduct encoding with respect to predictive errors.

FIG. 2 is a view showing the field configuration in the case where the interval N between independent fields is equal to 5.

In this figure, in a manner similar to FIG. 1, black circles and white circles represent lines of fields independently encoded and lines subjected to interfield prediction and encoding, respectively. Further, "o" and "e" represent odd and even fields, respectively.

Since independent fields are such that odd and even fields exist one after another, in the case where an image is stationary, odd and even fields (o) and (e) are predicted from odd and even fields, respectively.

For example, in the No. 4 frame and the No. 5 frame of FIG. 2, odd fields (o) are predicted from the .odd field (6o) of the No. 6 frame which is the succeeding (new) independent field, and even fields (e) are predicted from the even field (3e) of the No. 3 frame which is the preceding (old) independent frame.

In the case where an image is moving, prediction is conducted from both the preceding and succeeding (old and new) independent frames. However, since prediction is adaptively conducted from two fields, a field in which motion compensation is adapted is selected, thus making it possible to improve the problem of precision of the motion compensation, and/or the influence of turnback distortion.

Furthermore, since independent fields exist with, as a unit, a time interval one half of that in the case of the independent encoding every frame of the earlier application shown in FIG. 1, the predictive time length is short, thus making it easy to cope with fast motion and/or changes in an image.

In addition, since independent fields are such that odd and even independent fields exist one after another at a fixed interval, when an approach is employed to reproduce independent fields as they are in the case of high speed search, a searched image of high resolution can be provided in the state of a natural motion.

As stated above, the interfield predictive encoder and the decoder adapted therefor according to this invention employs the following approach. Namely, this approach is to set, in advance, at a fixed interval (several fields), independent fields independently encoded within fields without using interfield prediction from successive fields of image signals inputted in succession. In this case, the above-mentioned independent fields are such that odd and even fields exist one after another, and non-independent fields exist between independent fields. Such non-independent fields are encoded as follows. An approach is employed (1) to make a prediction on the basis of predictive signals by both the preceding and succeeding (old and new) independent fields to conduct encoding with respect to predictive errors, or (2) to adaptively mix predictive signals (linear predictive value) by both the preceding and succeeding (old and new) independent fields at a mixing ratio for providing a predictive signal of the highest predictive efficiency in dependency upon changes in signals every block in respective non-independent fields. Accordingly, while coping with functions required for the storage system media such as random access or high speed search, etc., in the case where an image is stationary, prediction is suitably made from the same fields (odd field and odd field, or even field and even field), while in the case where an image is moving, it is easy to cope with fast motion of an image and/or changes in an image by a moving image signal subjected to interlace scanning because the predictive time length is short to improve the prediction efficiency, and to permit predictive errors (residuals) to be reduced by improving the prediction efficiency. As a result, a quantity of data subject to encoding can be reduced.

Furthermore, in accordance with the apparatus of this invention, since independent fields are such that odd and even fields exist at a fixed interval, if an approach is employed to reproduce such independent fields as they are in the case of a high speed search, a searched image of high resolution can be provided in the state of a natural motion.

In addition, in accordance with the apparatus of this invention, the capacity of the image memory can be reduced to one half of that in the case of the processing every frame, and the apparatus can be simplified.

DETAILED DESCRIPTION OF THE PREFERRED EMBODIMENTS

Several preferred embodiments of an interfield predictive encoder and a decoder adapted therefor according to this invention will now be described with reference to the attached drawings. <Configuration of encoder according to a first embodiment of this invention>

Figure 3:
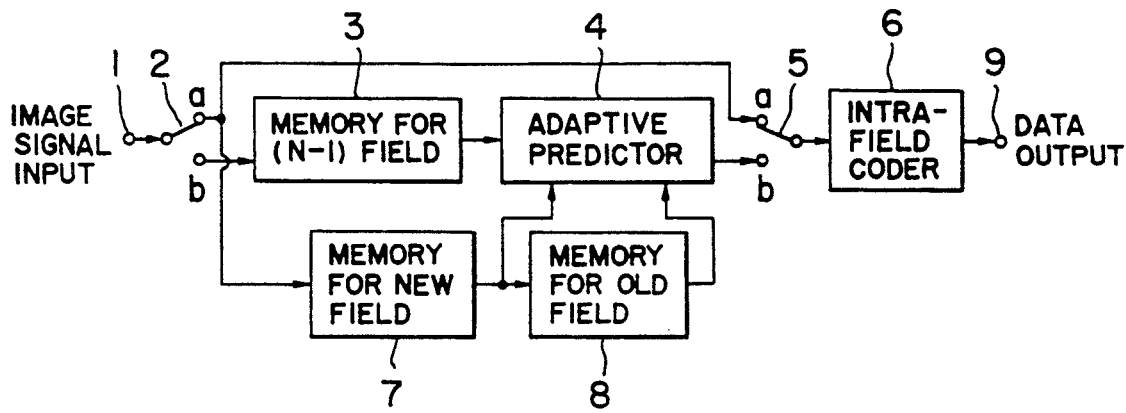
FIG. 3 is a block diagram showing the configuration of an interfield predictive encoder according to a first embodiment of this invention.

FIG. 3 is a block diagram showing the configuration of a first embodiment of an interfield predictive encoder.

In FIG. 3, an image signal input terminal 1 is connected to the input terminal of a changeover switch 2. The a side output terminal of the changeover switch 2 is connected to each of the a side input terminal of a changeover switch 5 and the input terminal of a field memory (new) 7. Further, the b side output terminal of the changeover switch 2 is connected to the b side input terminal of the changeover switch 5 through an (N−1) field memory 3 and an adaptive predictor 4.

Figure 8:
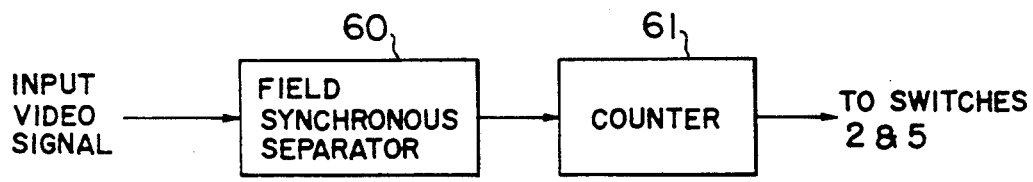
FIG. 8 is a block diagram showing the configuration of a circuit for generating a control signal fed to the switches of FIGS. 3, 5, 6 and 7.

The switches 2 and 5 are changed in response to a switch control signal. FIG. 8 shows a circuit for generating the switch control signal. As shown in FIG. 8, the switch control circuit includes a field sync separator 60 which separates a field sync signal from the input video signal. The pulses of the field sync signal outputted from the field sync separator 60 are counted by a counter 61. Each time N successive pulses of the field sync signal are counted by the counter 61, the counter 61 outputs a pulse. The duration of each output pulse from the counter 61 agree with the one-field period. The sequentially-outputted pulses from the counter 61 compose the switch control signals fed to the switches 2 and 5.

The changeover switch 2 serves to selectively deliver an input signal from the image signal input terminal 1 to either the a side input terminal of the changeover switch 5 and the field memory (new) 7 or the (N−1) field memory 3. At the time of encoding independent fields, the changeover switch 2 is switched to the a side. On the other hand, at the time of encoding non-independent fields, the changeover switch 2 is switched to the b side.

The output terminal of the field memory (new) 7 is connected to each of the input terminal of a field memory (old) 8 and one input terminal of the adaptive predictor 4. The output terminal of the field memory (old) 8 is connected to the other input terminal of the adaptive predictor 4.

The changeover switch 5 serves to carry out switching between a signal from the a side output terminal of the changeover switch 2 and an output signal from the adaptive predictor 4. In the same manner as in the changeover switch 2, at the time of encoding independent fields, the changeover switch 5 is switched to the a side, and at the time of encoding non-independent fields, the changeover switch 5 is switched to the b side.

The output terminal of the changeover switch 5 is connected to a data output terminal 9 through an intrafield encoder 6.

The (N−1) field memory 3 [N is an odd number equal to 3 or more] serves to encode non-independent fields after independent fields used for prediction are encoded.

the intrafield encoder 6 is comprised of an orthogonal converter, a quantizer, and a variable length encoder, etc.

The above-mentioned respective two field memories (new and old) 7 and 8 serve to form predictive signals (predictive values) on the basis of two preceding and succeeding fields. <Operation of the encoder according to the first embodiment>

In the configuration of the first embodiment of the encoder shown in FIG. 3, a moving image signal (successive fields) inputted from the image signal input terminal 1 is delivered to the a side input terminal of the changeover switch 5 through the changeover switch 2 switched to the a side in order that only one field every N fields is independently subjected to encoding processing within that field.

Here, in order to allow independent fields to be such that odd and even fields exist one after another, the interval N between independent fields is set to odd number.

From a viewpoint of implementation of random access and/or high speed search, it is desirable that the interval N between independent fields is small. However, when encoding is independently carried out within the field, a large quantity of data are generated, resulting in poor efficiency. Accordingly, it is suitable that N is approximately 5 to 9.

On the other hand, the changeover switch 5 interlocks with the changeover switch 2. In the independent fields where these switches are connected to the side, a signal is directly inputted to the intrafield encoder 6, at which that signal is encoded.

The intrafield processing at the intrafield encoder 6 is carried out as follows. First, a signal is transformed to a coefficient component by the orthogonal transform method such as DCT (Discrete Cosine Transform), etc. using about 8×8 pixel blocks as a unit by means of an orthogonal transformer in order to provide a higher coding efficiency. Then, the transformed signal is quantized at a suitable number of steps every coefficient components at a quantizer. Further, since the distribution of the quantized signal is concentrated in the vicinity of zero, that signal is converted to a variable length code such as Huffman code, etc., by means of a variable length encoder, and redundancy is spatially removed. Then, that code is outputted as variable length digital data from the data output terminal 9. The signal thus outputted is recorded or transmitted.

On the other hand, it is necessary that predictive signals at the encoder required for the predictive processing is prepared from quantized signals in order to allow them to be the same signals as those on the decoder side. It is to be noted that since in the case where predicted fields are not used for prediction for a second time as in the case of this invention, storage of errors does not take place, so deriving predictive signals from an original signal does not constitute a great problem.

Accordingly, in the first embodiment shown in FIG. 3, a moving image signal inputted from the image signal input terminal 1 is directly stored by two fields thereof into the field memory (new) 7 and the field memory (old) 8. When a signal of a new independent field is inputted, the content of the memory is updated by one field.

The processing in the predictive field will now be described. The changeover switches 2 and 5 are connected to the b side. A signal inputted is first guided to the (N−1) field memory 3. At this memory, the predictive field is delayed by (N−1) fields in order to first encode independent fields necessary for prediction. A predictive signal adaptively prepared by independent fields is subtracted from the above-mentioned delayed signal at the adaptive predictor 4 which will be described in detail, resulting in a predictive error (residual). This predictive error (residual) is encoded at the intrafield encoder 6 in the same manner as in the case of independent fields, and is outputted as digital data from the data output terminal 9. The coded predictive error thus outputted is recorded or transmitted. <Description of the adaptive predictor 4>

The adaptive predictor 4 in FIG. 3 was already invented by the present inventor. The patent application relating thereto was filed by this applicant. See USSN No. 07/514,015 (U.S. Pat. No. 4,982,285) "Apparatus for adaptive and inter-predictive encoding of video signal" (this predictor is the same as that used in Japanese Patent Application No. 108419/89 entitled "Adaptive interframe predictive encoding system").

Figure 4:
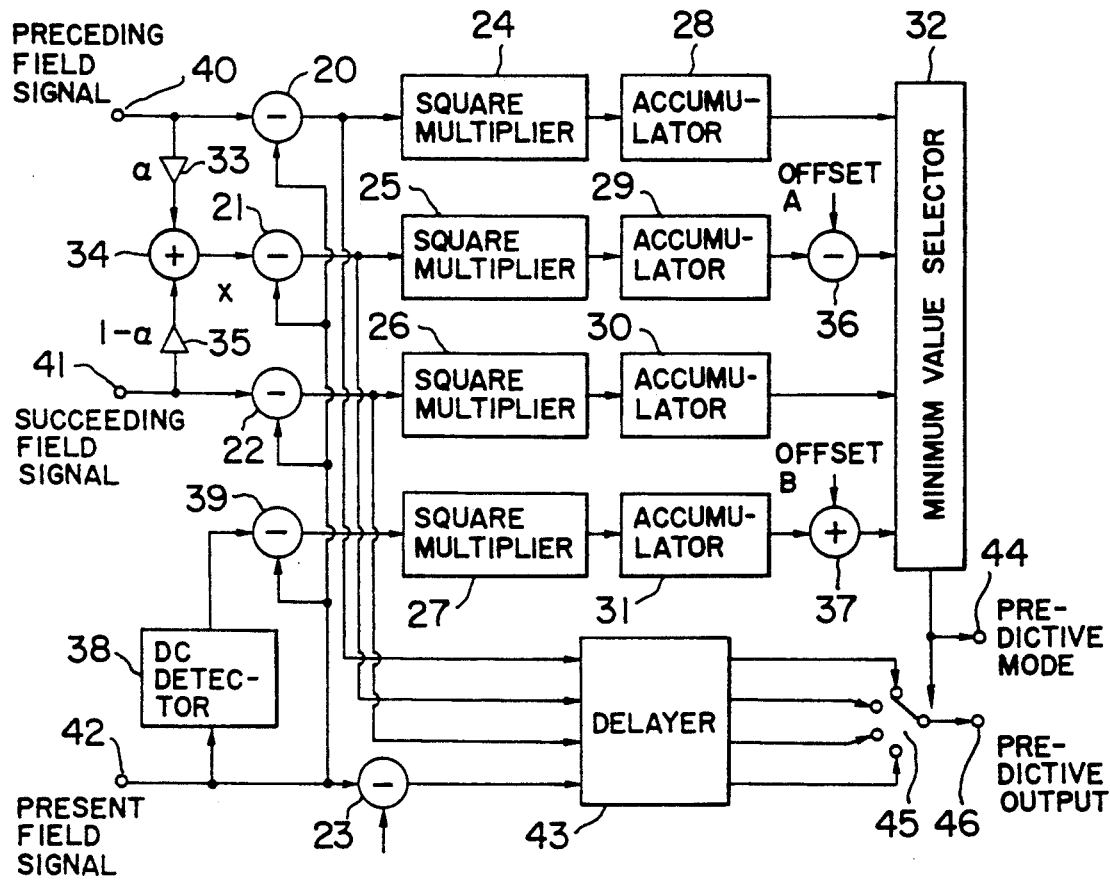
FIG. 4 is a block diagram showing the configuration of an adaptive predictor provided in the encoder according to the first embodiment.

FIG. 4 is a block diagram showing the configuration of the adaptive predictor 4. This adaptive predictor 4 is comprised of four kinds of predictors, and a signal processing unit for selecting an optimum prediction from these four kinds of predictions.

In this adaptive predictor 4, predictive signals by signals of both preceding and succeeding (old and new) independent fields are adaptively mixed at a mixture ratio for providing a predictive signal of the highest prediction efficiency in dependency upon changes in signals every block in respective independent fields between independent fields, thus to provide a desired predictive signal.

In an actual sense, there are various predictive modes described below;

(1) Secondary linear prediction by mixing of predictive signals from both preceding and succeeding (old and new) independent fields.

(2) Prediction by a predictive signal from the preceding (old) independent field (no mixing of a predictive signal from the succeeding (new) independent field).

(3) Prediction by a predictive signal from the succeeding (new) independent field (no mixing of a predictive signal from the preceding (old) independent field).

(4) Prediction from a fixed value (no prediction using any predictive signal).

Here, in the case of modes (2) and (3), an inputted value can be used as it is. Further, in the case of the mode (4), an inputted value can be processed with ease within the predictor.

The processing in the mode (2) will be first described. A signal inputted from the preceding (old) field signal input terminal 40 is subtracted from a signal subject to prediction inputted from the present field signal input terminal 42 at the predictive signal subtracter 20. Thus, a preceding (old) field predictive error (residual) is provided. The processing in the mode (3) is similar to the processing in the mode (2). Namely, a signal inputted from the succeeding (new) field signal input terminal 41 is subtracted at the predictive signal subtracter 22. Thus, a succeeding (new) field predictive error (residual) is provided.

On the other hand, a linear predictive signal in the mode (1) is determined by the following equation on the basis of the time relationship between a field to be predicted and independent fields used for prediction:

$$x = \alpha V_{mq} + (1-\alpha) V_{mp}$$

$$a = (m - mp)/N0 \leq a \leq 1$$

where X is a predictive signal, Vmq is a succeeding (new) field value, Vmp is a preceding (old) field value, m is a No. of a field to be predicted, mq is a succeeding (new) field No. and mp is a preceding (old) field No.

In FIG. 4, weight coefficients $a$ and $(-a)$ are multiplied by values of preceding (old) and succeeding (new) fields at multipliers 33 and 35, respectively. These values are added at an adder 34, resulting in a predictive signal X. This predictive signal is subtracted from a present field signal at the predictive signal subtracter 21. Thus, a field predictive error (residual) signal based on preceding and succeeding fields is provided.

Finally, prediction from a fixed value in the mode (4) (no prediction using any predictive signal) is carried out as follows. First, a fixed value (luminance of 50% level, color difference of 0 level, etc.) is subtracted from a present field signal at the predictive signal subtracter 23. It is conceivable that a DC component of a spatial adjacent block (e.g., upper block) is used as this fixed value. Anyway, processing is conducted within the field without conducting an interfield prediction.

The processing for selecting an optimum prediction will now be described. As an actual technique, evaluation is conducted by using a block square error of a predictive error (residual). To speak precisely, it is optimum to evaluate data generated at the subsequent encoding processing. To realize this, it is necessary to have four systems for the processing succeeding to the orthogonal transformation. However, this is a problem in realization of an apparatus therefor. The problem of the square error evaluation is as follows. When a value is determined as it is by the prediction from a fixed value (no prediction using any predictive signal), that value becomes equal to a large value irrespective of an actual quantity of data subject to encoding by the DC component of an error (residual).

To avoid this, a mean value of blocks is determined at the DC detector 33 to subtract it from a present field signal value at the subtracter 39 to determine a square error (dispersion). However, if such a value is used as it is, DC component of data subject to encoding is neglected, resulting in slightly rough error evaluation. Therefore, an offset B (positive value) is added after a square error is detected.

On the other hand, in the case of the precision based on the preceding and succeeding fields in the mode (1), an offset A (positive value) is subtracted after a square error is detected. The reason why such a processing is to consider the mode (1) of the highest occurrence probability to be preferential to some extent thus to prevent the predictive mode to be unnecessarily switched in the case where there is less change between fields and there is not so large difference between prediction errors in the modes (1) to (3). In the case where the occurrence probability of the mode (1) is increased by offset, and the predictive mode is subjected to entropy encoding by Huffman code, etc., predictive mode information can be transmitted by a less quantity of data. Here, the values of offsets A and B are empirically selected on the basis of the relationship between the quantity of data and the picture quality.

The processing in FIG. 4 is further conducted as follows. Respective predictive errors (residuals) given by outputs from the predictive signal subtracters 20 to 23 are converted to square values at square multipliers 24 to 27. These values thus obtained are accumulatively added for a time period corresponding to one block at one block accumulators 28 to 31. Thereafter, the value of the offset A is subtracted from an output from the one block accumulator 29 corresponding to the mode (1) at the subtracter 36. Further, the value of the offset B is added to an output from the one block accumulator 31 corresponding to the mode (4) at the adder 37.

By the above-mentioned processing, the error evaluation values in the modes (2) and (3) are provided as outputs from the one block accumulators 28 and 30. The error evaluation value in the mode (1) is provided as an output from the adder 36. In addition, the error evaluation value in the mode (4) is provided as an output from the adder 37. These error evaluation values are inputted to the minimum value selector 32.

In the minimum selector 32, the minimum one of four kinds of error evaluation values is selected. An information indication that this minimum value corresponds to any one of modes (1) to (4) is outputted. That predictive mode information is delivered to the changeover switch 45 and is outputted from the predictive mode output terminal 44. The information thus outputted is transmitted to the decoding side.

On the other hand, respective predictive errors (residuals) are delayed by a time period corresponding to one block required until error evaluation is completed at the one block delayer 43, and are then inputted to the changeover switch 45. At the changeover switch 45, a predictive error (residual) considered to be optimum by predictive mode information is selected. The predictive error thus selected is outputted from the predictive output terminal 46.

It is to be noted that since the adaptive predictive processing in the decoding system does not require simultaneous implementation of four kinds of predictions, and further does not require error evaluation, that processing is extremely simple as to compared to the encoding system. With respect to respective predictive values in the modes (1) to (3), it is sufficient to prepare at least a predictive value in the mode (1). For the modes (2) and (3), it is sufficient to set the weight coefficient value $a$ to 0 (zero) or 1. Also in the case of the mode (4), it is sufficient to carry out switching to a fixed value. Accordingly, enlargement of the apparatus scale by the adaption in the signal system is small.

By such an adaptive processing, in the case where there is no movement in an image, since the same fields (odd field and odd field, or even field and even field) as field to be predicted exist in the preceding (old) field or the succeeding (new) field, the same field as the preceding (old) field is selected. Thus, complete prediction can be conducted.

On the other hand, in the case where the image is moving, the same prediction as that in the stationary state (i.e., there is no movement in an image) is selected when that image moves only in a horizontal direction. Further, in the case where an image moves in a vertical direction, the prediction method is switched to any suitable prediction method in dependency upon degree of that movement.

Figure 1:
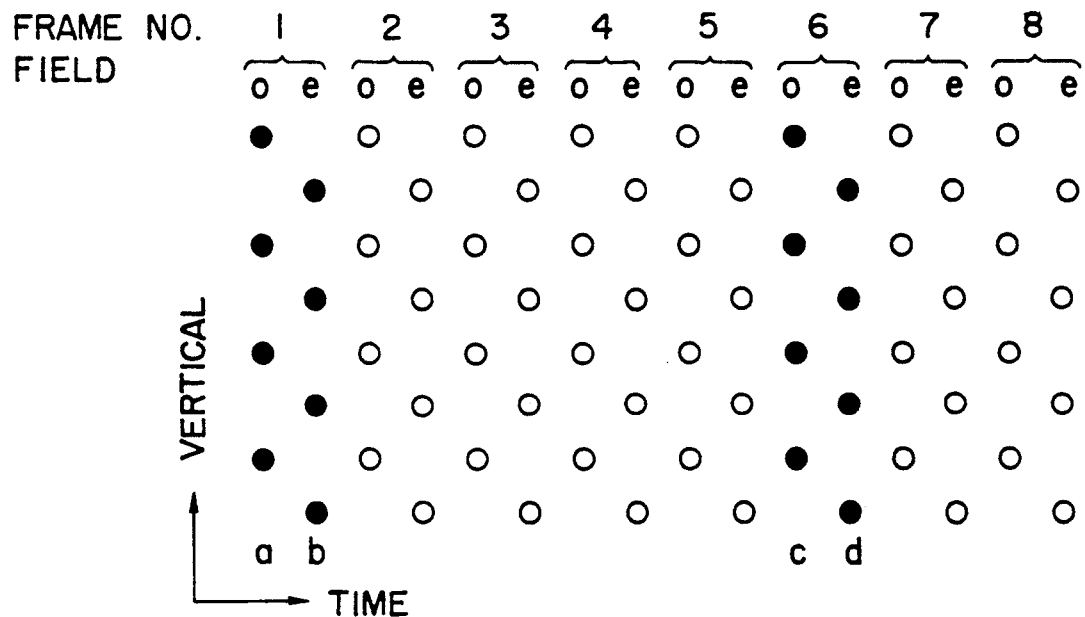
FIG. 1 is a view showing a field configuration in the earlier application by this applicant.
Figure 2:
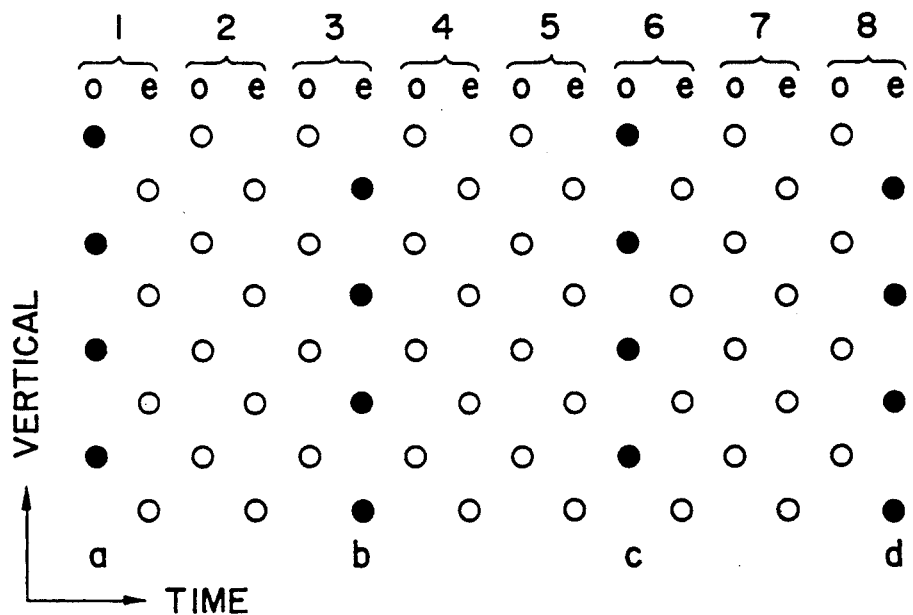
FIG. 2 is a view showing a field configuration in the apparatus according to this invention.

For example, in the case of the second frame (even field (4e), etc., of No. 4 frame in FIG. 2) when the interval between independent claims is assumed to be equal to 5, assuming that a quantity of movement 1.0, 2.0, 3.0, ... line (pixel) per each frame, if motion compensation of one pixel accuracy is conducted by prediction from the preceding (old) field, i.e., even field (3e) of No. 3 frame, line (pixel) positions are in correspondence with each other, resulting in a reasonable prediction. This prediction is the same as that in the prior art.

On the other hand, in the case of prediction from the succeeding (new) field, the distance between fields is 3 fields. Accordingly, since the fields are different (odd field and even field, or even field and odd field), if a quantity of movement is 0.5, 1.5, 2.5, . . . lines (pixels) per 3 fields, i.e., 0.33, 1.0, 1.66, 2.33. . . lines (pixels) per each frame, setting of the quantity of movement is adapted for motion compensation.

As stated above, the quantity of movement to be adapted varies in dependency upon the predictive direction. Thus, even a quantity of movement which was not adapted by motion compensation only on one side as in the prior art becomes easy to adapt motion compensation. <Description of the second embodiment of the encoder>

Figure 5:
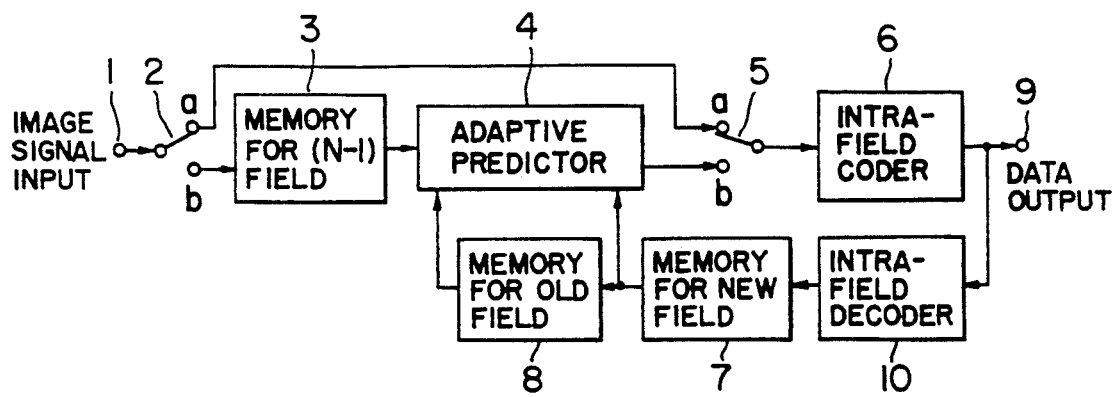
FIG. 5 is a block diagram showing the configuration of an interfield predictive encoder according to a second embodiment of this invention.

FIG. 5 is a block diagram showing the configuration of a second embodiment of an interfield predictive encoder according to this invention. In this figure, the same references are attached to the same components as those in FIG. 3, respectively.

The second embodiment is directed to the embodiment where local decoding is carried out. A signal subjected to intrafield encoding by the intrafield encoder 6 is decoded by the intrafield decoder 10. Thus, a reproduced imaged signal is provided. This independent field reproduced image signal is stored by two fields into the field memory (new) 7 and the field memory (old) 8. When a reproduced image signal of a new independent field is inputted, the memory content is updated by one field. In this case, any erroneous matching between data processing on the encoder side and that on the decoder side does not take place. The predictive operation, etc., is not different from that in the case shown in FIG. 3. <Description of the third embodiment of the encoder>

Figure 6:
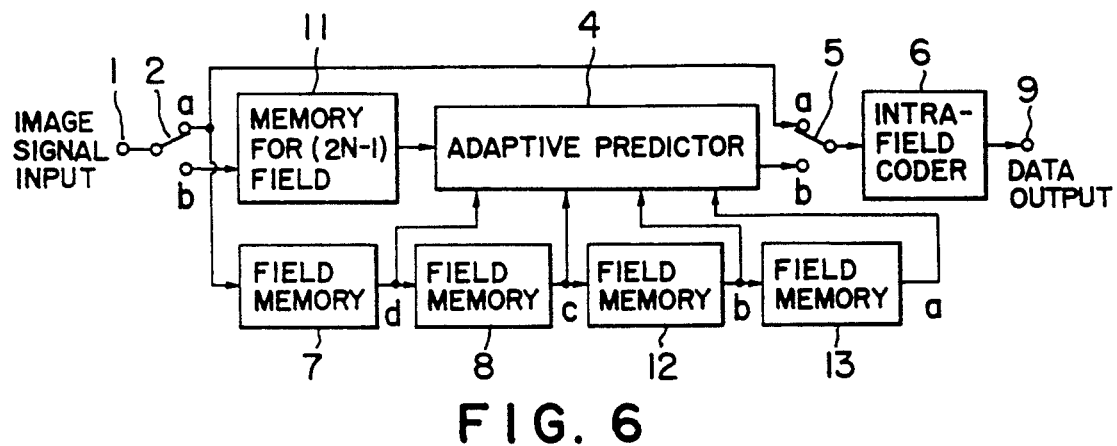
FIG. 6 is a block diagram showing the configuration of an interfield predictive encoder according to a third embodiment of this invention.

FIG. 6 is a block diagram showing the configuration of a third embodiment of an interfield predictive encoder according to this invention. The same reference numerals are attached to the same components as those in FIG. 3, respectively.

The third embodiment is directed to the embodiment where four independent fields are used for prediction. Four independent fields of a, b, c and d in FIG. 6 are all used for prediction. In the case of the encoder using two independent frames for prediction as in the first or second embodiment shown in FIG. 3 or 5, since only one independent field is used for prediction in respective odd/even fields, such an encoder is not effective against level change such as fade change. Further, since the frequency of how prediction in both directions is used is lowered, the encoding efficiency becomes poor to some extent.

On the contrary, in the case of the encoder to make a prediction from four independent fields, since the same two fields (odd field and odd field, or even field and even field) exist before and after, linear prediction is carried out from the preceding and succeeding fields even in the case where an image is stationary.

Thus, the encoder of this embodiment is effective against level change, and the S/N ratio of the predictive signal is improved. In this embodiment, the (N−1) field memory 3 in FIG. 3 for delaying fields used for prediction is replaced by (2N−1) field memory 11. Further, new field memories 12 and 13 are added, thus to carry out predictive processing by signals a, b, c and d from four field memories 7, 8, 12 and 13.

The predictive mode in the adaptive predictor 4 will now be described. The kind of linear predictions on both the preceding and succeeding sides is changed to three. Namely, in the case of the encoder using four independent fields for prediction, combinations of a and c, and b and d are supplemented in addition to the combination of b and c in the case of the encoder using two fields for prediction. It is to be noted that while a mode of only a, or d is conceivable, since the distance between fields is large, there is little possibility that such a mode is selected. Thus, selection of such a mode is not so effective. In addition, the mode using a or d is considered to be effective only in the case where there is a little motion in a vertical direction. The motion compensation is not necessarily required. <Configuration of the fourth embodiment of the decoder>

Figure 7:
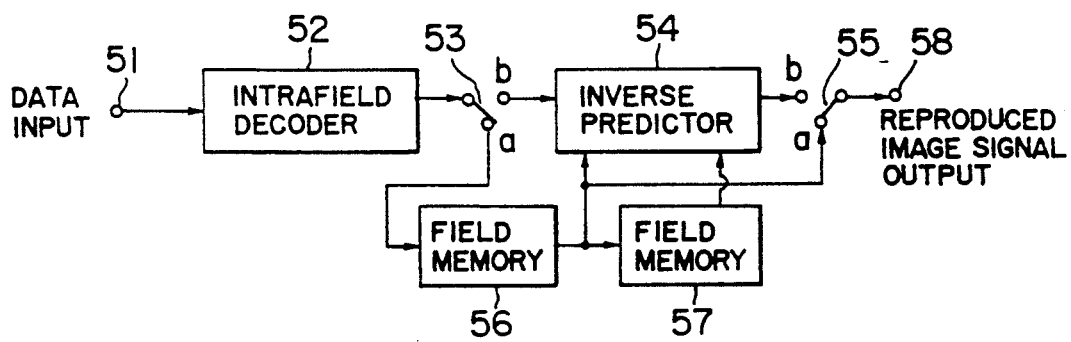
FIG. 7 is a block diagram showing the configuration of a decoder for an image signal according to a fourth embodiment of this invention.

FIG. 7 is a block diagram showing the configuration of a fourth embodiment of a decoder according to this invention. This decoder serves to apply decode processing data encoded by the encoder of the first or second embodiment shown in FIG. 3 or 5. It is to be noted that four field memories are required as decoder for the encoder of the third embodiment shown in FIG. 6, but such a decoder basically has the same configuration as that of the decoder of this embodiment. In this case, since it is sufficient that the capacity of the field memory is one half of that of the frame memory, the entire capacity is the same as that of the earlier application.

In FIG. 7, the data input terminal 51 is connected to the input terminal of the changeover switch 53 through an intrafield decoder 52.

The intrafield decoder 52 is comprised of a variable length decoder, an inverse quantizer, and an orthogonal inverter, etc.

The a side output terminal of the changeover switch 53 is connected to the input terminal of a field memory 56, and the b side output terminal of the changeover switch 53 is connected to the input terminal of an inverse predictor 54.

The changeover switch 53 serves to selectively deliver an input signal (output signal from the intrafield decoder 52) to either the inverse predictor 54 or the field memory 56. At the time of the independent fields, the changeover switch 53 is switched to the a side. On the other hand, at the time of non-independent fields, the changeover switch 53 is switched to the b side.

The output terminal of the inverse predictor 54 is connected to the b side input terminal of the changeover switch 55. The output terminal of the field memory 56 is predictor 54 and the field memory 57, and is further switch 55. The output terminal of the field memory 57 is connected to the input terminal of the inverse predictor 54.

Two field memories 56 and 57 serve to form a predictive signal (predictive value) on the basis of two preceding and succeeding independent fields.

The changeover switch 55 serves to carry out switching between an output signal from the inverse predictor 54 and an output signal from the field memory 56. In the same manner as the changeover switch 53, at the time of independent fields, the changeover switch 55 is switched to the side, and at the time of non-independent fields, the changeover switch 55 is switched to the b side.

In addition, the output terminal of the changeover switch 55 is connected to the playback image signal output terminal 58.

The configuration of the above-mentioned decoder according to the fourth embodiment is basically the same as that of the earlier application. <Operation of the decoder according to the fourth embodiment>

In the configuration of the fourth embodiment in regard to the decoder shown in FIG. 7, variable length digital data inputted from the data input terminal 51 is subjected to intrafield decoding by the intrafield decoder 52. The independent field becomes a reproduced or playback image signal. Since the changeover switch 53 is switched to the a side at the time of this independent field, the above-mentioned playback image signal is inputted to the field memory 56 through the changeover switch 53, and is stored thereinto. At the same time, an image signal which has been stored until now in the field memory 56 shifts to the field memory 57, at which this image signal is rewritten. Further, since the changeover switch 55 is switched to the a side at the time of this independent field, the image signal which has been stored until now in the field memory 56 is outputted from the playback image signal output terminal 58 through the changeover switch 55.

With respect to the non-independent field subjected to predictive processing between fields, an output from the intrafield decoder 52 is a predictive error. Since the changeover switch 53 is switched to the b side at the time of this non-independent field, the above-mentioned predictive error is inputted to the inverse predictor 54 through the changeover switch 53.

At the inverse predictor 54, the same predictive signal as that on the encoder side is added, resulting in a playback image signal. Since the changeover switch 55 is switched to the b side at the time of this non-independent field, the above-mentioned playback image signal is outputted from the playback image signal output terminal 58 through the changeover switch 55.

It is to be noted that since data transmitted from the encoder side are such that data of the independent fields are transmitted preceding to data of the non-independent fields, an approach for correcting this is employed on the decoder side to delay each playback image signal of independent fields by N fields to output it from the field memory 56. Namely, the field memory 56 is used also for correction of time.

In addition, it is to be noted that this invention is not limited to an adaptive predictor. Namely, this invention can be applied to a predictor to mix predictive signals corresponding to respective non-independent fields at a predetermined mixing ratio, in place of employing an adaptive prediction, on the basis of both preceding and succeeding (old and new) independent fields, thus to predict a signal.

What is claimed is:

1. An interfield predictive encoder comprising:
   first encoder means for setting, from successive fields of image signals inputted in succession, independent fields located at a fixed interval and such that odd and even fields exist one after another to independently encode these independent fields within respective fields;
   predictive signal formation means for forming predictive signals of non-independent fields between said independent fields on the basis of signals of respective independent fields before and after those non-independent fields; and
   second encoder means for predicting signals of said non-independent fields on the basis of predictive signals corresponding thereto to conduct encoding with respect to predictive errors.

2. An interfield predictive encoder comprising:
   first encoder means for setting, from successive fields of image signals inputted in succession, independent fields located at a fixed interval and such that odd and even fields exist one after another to independently encode these independent fields within respective fields;
   predictive signal formation means for forming predictive signals of non-independent fields between said independent fields on the basis of signals of independent fields before and after respective non-independent fields; and
   second encoder means for adaptively mixing predictive signals by signals of the both independent fields before and after the respective non-dependent fields formed by said predictive signal formation means at a mixing ratio for providing a predictive signal of the highest predictive efficiency in dependency upon changes of signals every block in the respective non-independent fields to predict signals every block of said non-independent fields on the basis of the mixed predictive signals to conduct encoding with respect to respective predictive errors.

3. A decoder for carrying out decoding processing corresponding to the above-mentioned encoding processing on the basis of data encoded by said interfield predictive encoder as set forth in claim 1 to thereby decode an image signal of successive fields.

4. A decoder for carrying out decoding processing corresponding to the above-mentioned encoding processing on the basis of data encoded by said interfield predictive encoder as set forth in claim 2 to thereby decode an image signal of successive fields.

* * * * *